March 23, 1937.  J. G. GIBSON  2,074,839
VALVE
Filed March 13, 1935
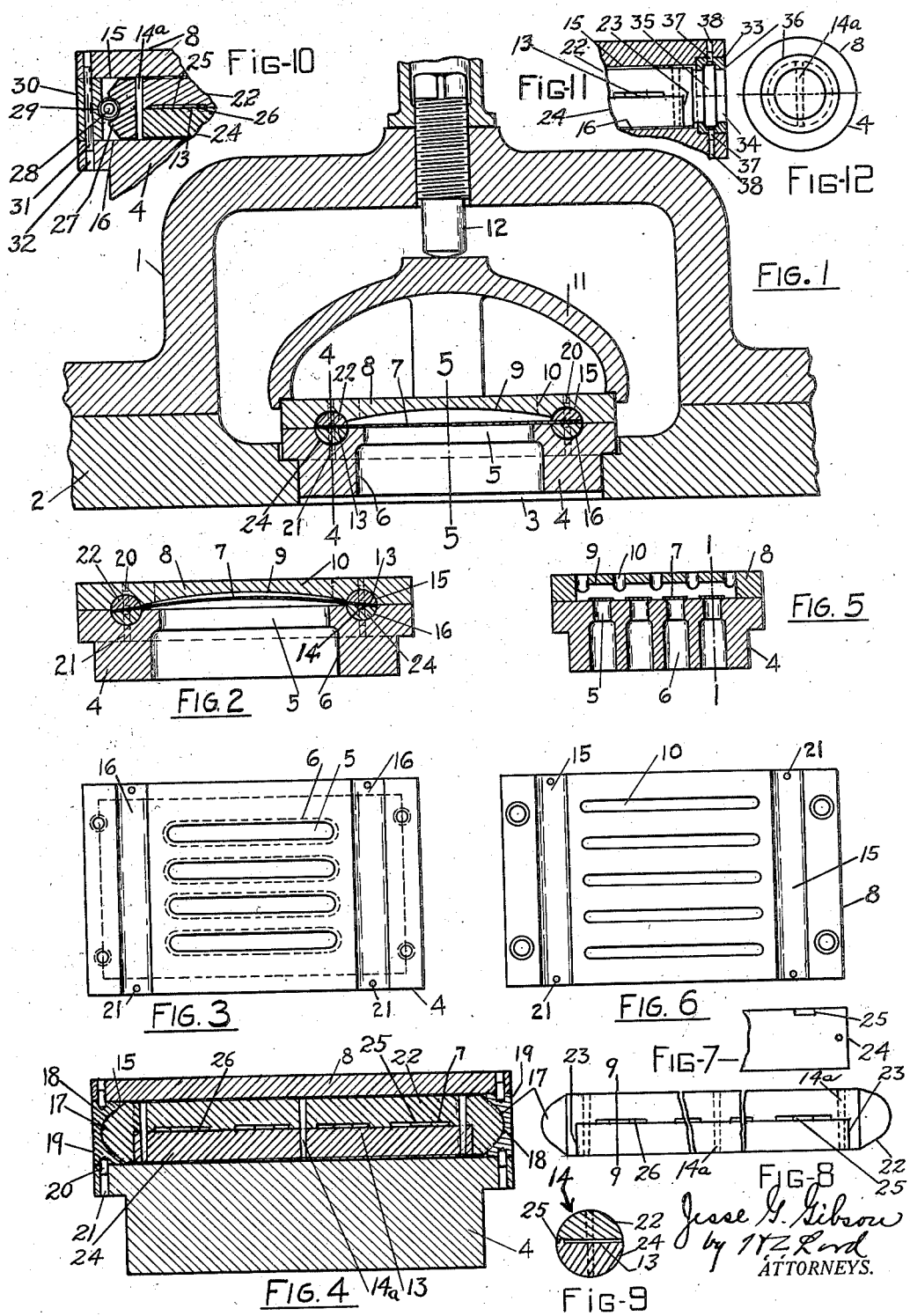

Patented Mar. 23, 1937

2,074,839

UNITED STATES PATENT OFFICE 2,074,839

VALVE

Jesse G. Gibson, Bradford, Pa., assignor of fifty-one per cent to Bovaird and Company, Bradford, Pa., a copartnership composed of George W. Bovaird and Joseph H. Bovaird Application March 13, 1935, Serial No. 10,943

12 Claims. (Cl. 277—60)

The present invention is designed to improve guiding supports for feather valves giving to such supports a more definite guiding action and in this respect is an improvement on my invention disclosed in Patent No. 1,947,935 dated February 20, 1934. In that structure the pivot pins for the feather plates were journaled in complementary grooves in the seat and guard plate. These grooves were closed at the ends of the pins. The present invention is designed to improve this structure by providing bearing surfaces for the pins at the ends of the pins in the form of bearing plates, or blocks which may have more definite centers and better bearing material than the material of the seat and guard. Preferably also the pins between the bearing surfaces at the ends are formed with wear clearances between the pin surfaces and the walls of the grooves. The invention also contemplates an imrovement in the pins not only to better afford bearing surfaces at the ends, but also to improve the mounting of the plates in the pins, particularly with relation to limiting the sliding movement of the plates in the pins. Features and details of the invention will appear from the specification and claims.

A preferred embodiment of the invention is illustrated in the accompanying drawing as follows:—

Fig. 1 shows a sectional view through the valve, the valve proper being on the section line 1—1 in Fig. 5.

Fig. 2 is a similar section showing the valve plate flexed.

Fig. 3 is a plan view of the seat plate.

Fig. 4 is an enlarged section on the line 4—4 in Fig. 1.

Fig. 5 is a section on the line 5—5 in Fig. 1.

Fig. 6 is a bottom view of the guard plate.

Fig. 7 is an enlarged plan view of a portion of the hinge pin.

Fig. 8 is an enlarged detached elevation of the hinge pin.

Fig. 9 is a section on the line 9—9 in Fig. 7.

Fig. 10 is a sectional view of an alternative hinge structure.

Fig. 11 is an enlarged sectional view of a further modification.

Fig. 12 is an end view of the modification shown in Fig. 11.

1 marks the valve case, 2 the cylinder wall, 3 a port leading to the cylinder, and 4 a seat plate which is arranged over, or in the cylinder port. The seat plate is provided with a series of valve openings 5. Surrounding each opening there is a valve seat 6.

Feather valve plates 7 are adapted to close the openings 5, closing on the seats 6. A guard plate 8 is arranged above the seat plate. It has guard surfaces 9 against which the plates are flexed and openings 10 which are arranged between the openings 5. A pressure plate 11 rests on the guard plate and pressure is exerted on the pressure plate by means of a screw 12 extending through the case. With this construction the seat plate and guard plate are firmly secured in place through the pressure thus afforded. The ends of the feather plates extend through, or into slots 13 into rocking pins 14. These pins are arranged in opposing bearing grooves 15 and 16 in the plates 4 and 8.

The slots 13 may be formed in any convenient manner. As shown the pins are made in halves and are united by any desired process. The feather plates make a sliding fit in the slots so as to seal the pockets at the outer ends of the plates from the material passing through the valve. In this way the valves are free to move in flexing and are properly guided in their seats and the pockets at the ends of the feather plates are substantially sealed so that there is no accumulation of carbon to interfere with the free movement of the plates, or to subject them to undue wear. Preferably the feather plates are provided with these rocking pins at both ends, as shown.

The pins have spherically shaped ends 17 which are journaled in bearings 18 in discs 19 forming a close fit with the opening formed by the grooves 15 and 16 and are clamped in this position as the guard plate is clamped in position by the screw 12. These discs are provided with pins 20 which extend into openings 21 in the seat plate 4 and guard plate 8 and prevent the discs 19 from turning in the openings and positively secure the discs in the openings. The pins are preferably formed in two parts and are preferably secured together by tapered pins 14a headed over on their ends, the upper part 22 containing the slots 13 which receive the feather plates 7. The part 22 is notched at 23 and the lower part 24 of the pin is placed in the notched portion of the part 22. The ends of the pin form a complete cylinder with the upper part 22 and are provided with a smooth one-piece ball end. The part 24 has small lips 25 which extend into the slots 13 and form stops at the outer ends of the slots 13 for limiting the outward movement of the feather blades 7. Preferably the length of the lips 25 is less than the width of the slots 13 leaving clearance spaces 26 through which any leakage through the seal established by the blades with the walls of the slot may be discharged. The stops are particularly advantageous with relation to pins used at the parting between the guard and the seat as without the stops the plates are apt to slip endwise into the parting beyond the opening and prevent the proper seating of the guard on the seat. The blades are so thin that this may occur without being observed. Preferably the part 22 of the pin 14 and the discs 19 are of hardened steel, or of desirable bearing metal. The bottoms of the slots 13 are in a plane with the face of the valve seat and the proper operating of the valve makes it desirable that the relations of the pins, seat and plates should be very accurately located. The ball ends 17 in conjunction with the bearing cavities 18 form perfect centering bearings for the pins involving very slight friction in their movement. Preferably there may be, if desired, a slight wear clearance between the walls of the opening formed by the grooves 15 and 16 and the surfaces of the pins, so that while there is substantial sealing there is very free movement. This is particularly desirable where the pin opening is formed in the parting between the separable guard and the seat in that it does not depend on extreme accuracy in the registering of the parts of the opening along the pin.

In the modification shown in Fig. 10 the seat 4 and guard plate 8 are similar to that shown in Fig. 1. The hinge pin is similar in structure except at the end of the pin there is a socket 27 in which is pressed a ball 28. The ball forms a bearing with a socket 29 in a disc 30. The disc closing the opening formed by the grooves 15 and 16 and forming a close fit with the walls of the opening and being secured against turning and positively locked in place by pins 31 which extend through the discs into openings 32.

In the modification of Figs. 11 and 12 the openings formed by the grooves 15 and 16 are similar to those in Fig. 1 except that the ends of the grooves are slightly enlarged at 33. The ends of the pins are formed with trunnions 34 having an annular rib 35 thereon. These trunnions are journaled in split bearing collars 36 which make a close fit in the enlargements 33. The collars have extending pins 37 which extend into openings 38. The pins outside of these bearing surfaces in the modifications of Figs. 10, 11 and 12 are substantially the same in structure as those in Figs. 1 to 9.

What I claim as new is:—

1. In a feather valve, the combination of a seat having a valve opening; a pin bearing at the end of the valve opening; a resilient feather valve plate closing the valve opening; and a two-part hinge pin for the plate arranged in the bearing, one part of the pin having solid ends and being notched intermediate its ends to receive the other part of the pin and the pin being slotted at the parting between the parts to receive the plate.

2. In a feather valve, the combination of a seat having a valve opening; a pin bearing at the end of the valve opening; a resilient feather valve plate closing the valve opening; and a two-part hinge pin for the plate arranged in the bearing, one part of the pin being notched to receive the other part of the pin and the pin being slotted at the parting between the parts to slidingly receive the plate, one of the parts having a lip extending into the slot to limit the sliding movement of the plate.

3. In a feather valve, the combination of a seat having a valve opening; a pin bearing at the end of the valve opening; a resilient feather valve plate closing the valve opening; a two-part pin arranged in the bearing, one part having solid ends forming bearing surfaces at the ends of the pin, said part being notched to receive the complementary part of the pin, one of said parts at least being slotted at the parting to receive the plate; and bearing surfaces operating on the bearing surfaces on the pin.

4. In a feather valve, the combination of a seat having a valve opening; a pin bearing at the end of the valve opening; a resilient feather valve plate closing the valve opening; a two-part pin arranged in the bearing, one part having bearing surfaces at its ends and being notched to receive the complementary part of the pin, a slot being provided in the pin at the parting to receive the plate; and bearing plates secured in the bearing and having bearing surfaces coacting with the bearing surfaces on the pin.

5. In a feather valve, the combination of a valve body having a valve seat, a separate valve guard, and a port through the seat, said body and guard having a pin-receiving opening in the parting between the seat and guard at the end of the port; a resilient feather valve plate operating on the valve seat between the guard and seat and controlling the port; a hinge pin in the pin-receiving opening from which the plate extends, said pin rocking with the plate and providing clearance intermediate its ends between the pin and side walls of the pin-receiving opening; and bearings for the ends of the pin centering the pin with relation to the opening and maintaining the clearance between the pin and the opening for relieving the surfaces along the walls of the opening of the valve thrusts upon the pin.

6. In a feather valve, the combination of a valve body having a valve seat, a separate valve guard and a port through the seat, said body and guard having a pin-receiving opening in the parting between the seat and guard at the end of the port; a resilient feather valve plate operating on the valve seat between the guard and seat and controlling the port; a hinge pin in the pin-receiving opening from which the plate extends, said pin rocking with the plate and providing clearance intermediate its ends between the pin and side walls of the pin-receiving opening; and bearings for the ends of the pin centering the pin with relation to the opening and maintaining the clearance between the pin and the opening for relieving the surfaces along the walls of the opening of the valve thrusts upon the pin, one of the bearings being in a bearing block secured in the parting between the guard and seat.

7. In a feather valve, the combination of a valve body having a valve seat, a separate valve guard and a port through the seat, said body and guard having a pin-receiving opening in the parting between the seat and guard at the end of the port; a resilient feather valve plate operating on the valve seat between the guard and seat and controlling the port; a hinge pin in the pin-receiving opening from which the plate extends, said pin rocking with the plate and providing clearance intermediate its ends between the pin and side walls of the pin-receiving opening; and bearings for the ends of the pin centering the pin with relation to the opening and maintaining the clearance between the pin and the opening for relieving the surfaces along the walls of the opening of the valve thrusts upon the pin, the bearing at each end of the pin being in a bearing block secured in the parting between the guard and seat.

8. In a feather valve, the combination of a valve body and guard having a valve seat and a port through the seat, the said body and guard having a pin-receiving opening at the end of the port; a resilient feather valve plate operating on the valve seat and controlling the port; a hinge pin for the plate in the pin-receiving opening, said pin rocking with the plate and having bearing surfaces at its ends, said pin making a closure along the walls of the pin-receiving opening; and bearings for the bearing surfaces of the pin providing wear clearance and centering the pin and relieving the closure surfaces of the valve thrusts on the pin.

9. In a feather valve, the combination of a valve body and guard having a valve seat and a port through the seat, said body and guard having a pin-receiving opening at the end of the port; a resilient feather valve plate operating on the valve seat and controlling the port; a hinge pin for the plate in the pin-receiving opening, said pin rocking with the plate and having bearing surfaces at its ends, said pin providing wear clearance making a closure along the walls of the pin-receiving opening; and bearings for the bearing surfaces of the pin centering the pin and relieving the closure surfaces of the valve thrusts on the pin, the bearing for one end of the pin being in a bearing block secured in the body and guard.

10. In a feather valve, the combination of a seat having a valve opening; a separable guard above the opening; a pin bearing at the end of the valve opening and at the parting between the guard and seat; a resilient feather valve plate closing the opening and operating between the guard and seat; a hinge pin for the plate in the bearing, said pin having a slot therethrough for the plate in which the end of the plate is slidingly mounted; and a stop in the slot limiting the sliding movement of the plate.

11. In a feather valve, the combination of a seat having a valve opening; a separable guard above the opening; a pin bearing at each end of the opening; a resilient valve plate closing the valve opening and operating between the guard and seat; a hinge pin for the plate in each bearing, each pin having a slot therethrough in which an end of the plate is slidingly mounted; and a stop in each slot limiting the sliding movement of the plate.

12. In a feather valve, the combination of a seat having a valve opening; a separable guard above the opening; a pin bearing at the end of the valve opening and at the parting between the guard and seat; a resilient feather valve plate closing the opening and operating between the guard and seat; a hinge pin for the plate in the bearing, said pin having a slot therethrough for the plate in which the end of the plate is slidingly mounted; and a stop in the slot limiting the sliding movement of the plate, said stop being of less area than the cross area of the slot providing free passage through the slot past the stop.

JESSE G. GIBSON.